US008673148B2

(12) United States Patent
Straeffer et al.

(10) Patent No.: US 8,673,148 B2
(45) Date of Patent: Mar. 18, 2014

(54) MULTIFILTRATION CARTRIDGE FILTRATION APPARATUS

(75) Inventors: Gregory Straeffer, North Chelmsford, MA (US); Kevin Rautio, Manchester-by-the-Sea, MA (US)

(73) Assignee: EMD Millipore Corporation, Billerica, MA (US)

( * ) Notice: Subject to any disclaimer, the term of this patent is extended or adjusted under 35 U.S.C. 154(b) by 380 days.

(21) Appl. No.: 12/291,079

(22) Filed: Nov. 6, 2008

(65) Prior Publication Data

US 2009/0200226 A1   Aug. 13, 2009

Related U.S. Application Data

(60) Provisional application No. 61/065,117, filed on Feb. 8, 2008.

(51) Int. Cl.
*B01D 63/12* (2006.01)
*B01D 61/14* (2006.01)

(52) U.S. Cl.
USPC .............. 210/321.85; 210/321.83; 210/493.4; 210/650

(58) Field of Classification Search
None
See application file for complete search history.

(56) References Cited

U.S. PATENT DOCUMENTS

| | | | | |
|---|---|---|---|---|
| 3,722,694 A | * | 3/1973 | Agranat | 210/321.89 |
| 3,774,771 A | * | 11/1973 | Manjikian et al. | 210/321.87 |
| 3,962,097 A | | 6/1976 | Reiman et al. | |
| 4,083,780 A | * | 4/1978 | Call | 210/652 |
| 4,333,832 A | * | 6/1982 | Siwecki et al. | 210/195.2 |
| 4,548,714 A | * | 10/1985 | Kirwan et al. | 210/232 |
| 4,886,597 A | * | 12/1989 | Wild et al. | 210/321.68 |
| 5,034,126 A | * | 7/1991 | Reddy et al. | 210/321.74 |
| 5,096,584 A | * | 3/1992 | Reddy et al. | 210/321.74 |
| 5,238,563 A | | 8/1993 | Smith et al. | |
| 5,858,229 A | * | 1/1999 | Uemura et al. | 210/321.75 |
| 6,132,613 A | * | 10/2000 | Hopkin et al. | 210/321.68 |
| 2002/0070158 A1 | * | 6/2002 | Buecher et al. | 210/321.74 |
| 2005/0029192 A1 | * | 2/2005 | Arnold et al. | 210/641 |
| 2005/0121380 A1 | * | 6/2005 | De La Cruz | 210/321.83 |
| 2008/0011157 A1 | | 1/2008 | Wynn et al. | |

FOREIGN PATENT DOCUMENTS

| | | |
|---|---|---|
| EP | 1022051 A2 | 7/2000 |
| JP | 47-40362 | 12/1972 |
| JP | 2000-271460 A | 10/2000 |
| JP | 2007303805 A | 11/2007 |

OTHER PUBLICATIONS

International Preliminary Report on Patentability received for PCT Patent Application No. PCT/US2008/012517, issued on Aug. 10, 2010, 7 pages.
International Search Report and Written Opinion received for PCT Patent Application No. PCT/US2008/012517, mailed on Jan. 29, 2009, 9 pages.
Rautenbach et al., "Membrane Processes", Copyright 1989 John Wiley & Sons Ltd., pp. 109-113.

* cited by examiner

*Primary Examiner* — Krishnan S Menon
(74) *Attorney, Agent, or Firm* — EMD Millipore Corporation

(57) ABSTRACT

A filtration apparatus is provided comprising a housing having an inlet and an outlet and a plurality of spirally wound filtration cartridges. The filtration cartridges include two filter layers, a feed spacer layer and a permeate spacer layer. Seals are provided to prevent admixtures of feed and permeate and to permit recovery of permeate.

12 Claims, 4 Drawing Sheets

MULTIFILTRATION CARTRIDGE FILTRATION APPARATUS

CROSS-REFERENCE RELATED APPLICATIONS

This application claims the benefit of U.S. Provisional Patent Application No. 61/065,117, filed on Feb. 8, 2008 the entire contents of which are incorporated by reference herein.

BACKGROUND OF THE INVENTION

This invention relates to a filtration apparatus utilizing multiple spiral wound filtration cartridges.

In filtration, it is desirable to maximize filter area while minimizing the volume of the filter construction employed. One common means for attaining this result is to provide a construction formed by spirally winding a multi-layer material having a filter layer to form a tightly wound cylinder into which liquid is introduced at one spiral end and removed from the opposite spiral end. Means must be provided in the filter construction for assuring that all entering liquid passes through the filter medium prior to being removed, that is, the entering liquid must be prevented from simply passing through the spaces between the wound filter material without passing through the filter medium. Such constructions are shown, for example in U.S. Pat. No. 3,962,097.

A problem encountered in spiral wound construction results from the fragile characteristic of some membranes, such as ultrafiltration membranes which tear during filter cartridge construction.

In one process, spiral wound filters are formed of multiple layers of membrane filter and screens wherein a membrane filter layer is folded onto itself to form a V shape and two filter layers. Multiple leaves of membrane/screen stacks are glued in a flat orientation, and then rolled onto a perforated core. Layers are formed of feed and permeate screens. During the rolling operation, to form the spiral wound filter, because the membrane layers are sticky, they tend to wrinkle instead of sliding past each other. As a result, retention integrity is compromised. Flow properties are good, as negligible parasitic losses are measured from flow through the relatively short permeate channel (about 18 inches long).

In a second process, a single long leaf is used to form the spiral device. Glue is applied only in the rolled form. This limits the number of leaves to one, but reduces the stress on the membrane as it is being rolled. In a single layer format, devices made with this technique are shown to be integral. However, because the permeate channel is long (about 40 inches) the parasitic losses, primarily due to high pressure drop, in that channel are unacceptable high.

Accordingly, it would be desirable to provide a filtration apparatus which utilizes spiral wound filter cartridge construction to minimize permeate flow losses while providing satisfactory permeate production capacity.

SUMMARY OF THE INVENTION

The present invention provides a filtration apparatus having a housing with an inlet and an outlet and a plurality of filtration cartridges positioned within the housing. The filtration cartridges include a plurality of flat layer materials wound about a perforated core. The flat layers include two filter layers which are formed by folding a flat filter sheet into a V shape. Fluid permeable layers are also provided comprising a feed spacer layer and a permeate spacer layer. The filter layers and feed spacer layers are adhered to the perforated core. The permeate spacer layer is sealed to accept permeate passed through the filter layers and to direct permeate into the perforated core. The feed spacer layer is sealed to accept fluid feed and to direct feed through the filter layers. The filtration cartridges are sealed to prevent admixture of feed and permeate.

DESCRIPTION OF SPECIFIC EMBODIMENTS

Figure 1:
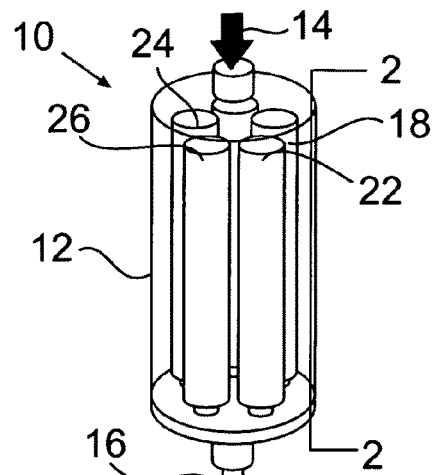
FIG. 1 is a perspective view of the filtration apparatus of this invention.

Referring to FIG. 1, the filtration apparatus 10 of this invention comprises a housing 12 having an inlet 14, an outlet 16 and a plurality of filtration cartridges 18, 20, 22, 24 and 26 and preferably five or six filtration cartridges.

Figure 2:
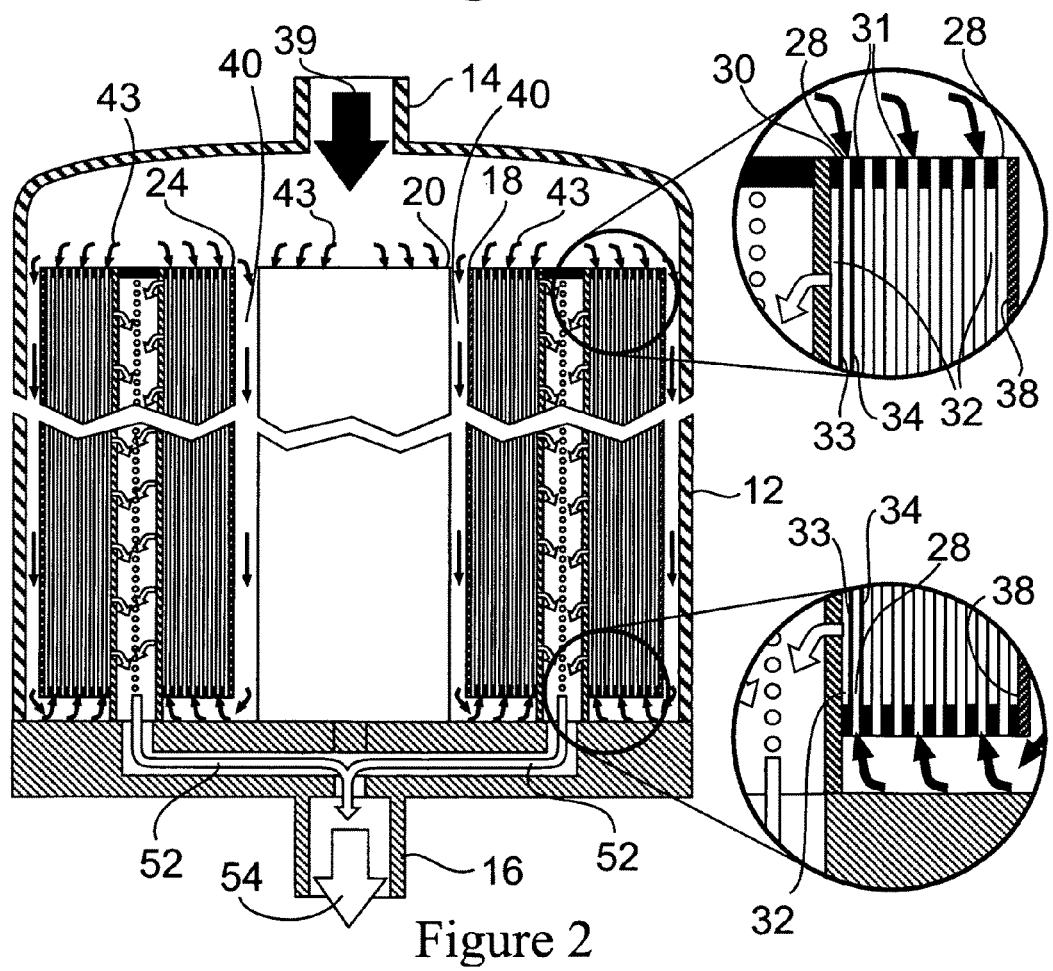
FIG. 2 is a cross sectional view of the filtration apparatus of FIG. 1 illustrating fluid flow to form permeate.
Figure 7:
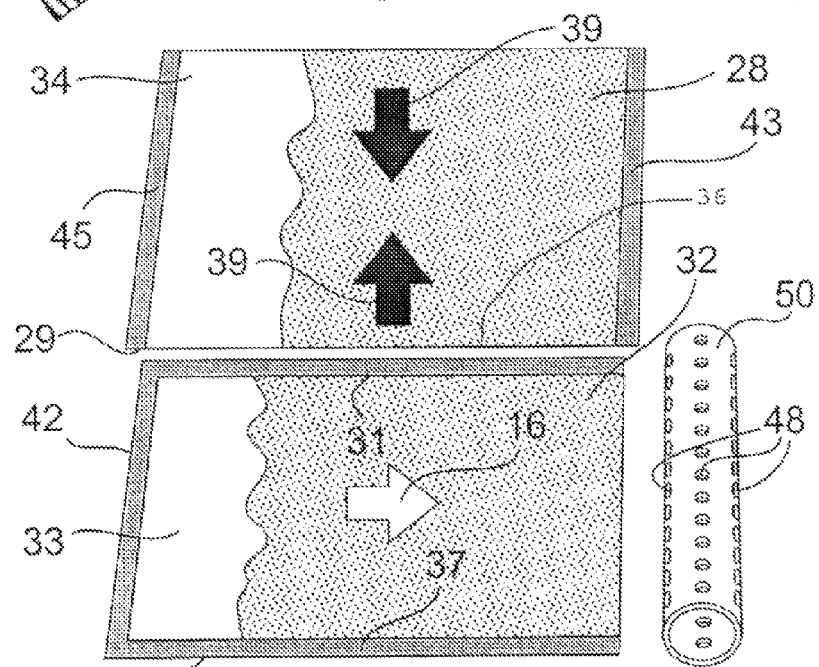
FIG. 7 illustrates an adhesive pattern for the feed spacer layer and the permeate spacer layer of this invention.

The fluid flow path within the filtration apparatus will be described with reference to FIGS. 2, 3, 6 and 7. As shown therein, incoming fluid feed 39 enters housing 12 through inlet 14. The fluid feed enters the filtration cartridges 18, 20, 22, 24 and 26 (FIG. 1) at the top surfaces and bottom surfaces thereof and into feed spacer layer 28. By causing the fluid feed to enter the filtration cartridges at their top surfaces and bottom surfaces, undesirable pressure drop along the feed paths is reduced as compared to causing the fluid feed to enter at only the top surfaces or the bottom surfaces. The top surface 30 of permeate spacer layer 32 is sealed by seals 31 from the interior of housing 12. Filtration layers 33 and 34 are positioned between feed spacer layer 28 and permeate spacer layer 32. The bottom surfaces 29 and 35 of both permeate spacer layer 32 and feed spacer layer 28 are sealed with seals 36 and 37 (FIG. 7). The feed spacer layer 28 includes side seals 43 and 45. The permeate spacer layer 32 includes side seal 42. The outer surface of each filtration cartridge 18, 20, 22, 24 and 26 is sealed with a fluid impermeable sheet 38 (FIG. 2). Incoming fluid feed 39 fills the spaces 40 (FIG. 2) between the filtration cartridges 18, 20, 22, 24 and 26 and enters these filtration cartridges through spirally wound feed spacer layer 28 as shown by arrows 43. The feed 39 passes through the filter layer 33 and 34 to form permeate 44. The permeate 44 travels in a spiral path within permeate spacer layer 32 as indicated by arrow 46 and passes through perforations 48 of core 50. The permeate then travels through pathways 52 (FIG. 2) and then through outlet 16 as indicated by arrow 54.

Figure 3:
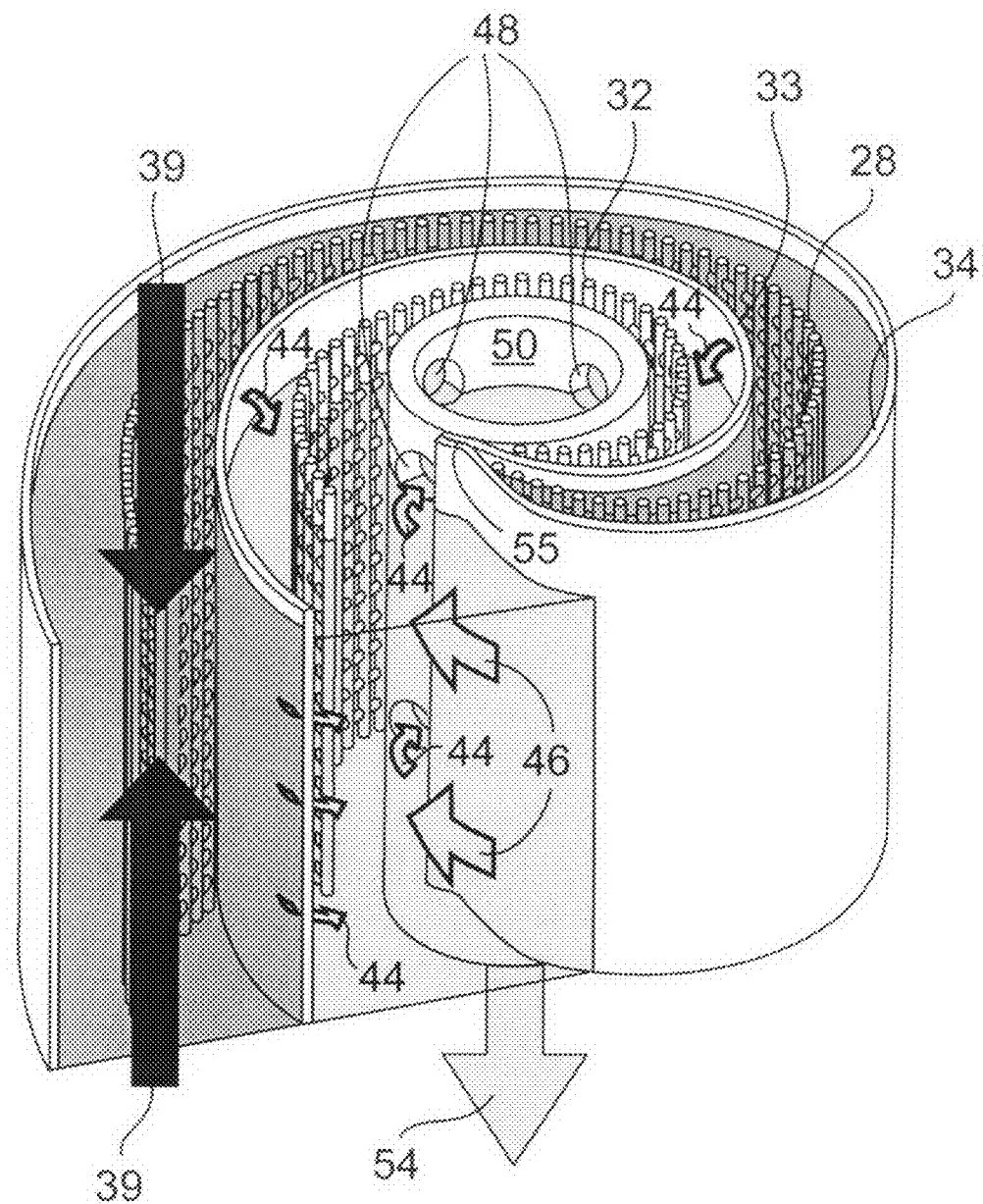
FIG. 3 is an exploded view of a filtration cartridge of this invention.

The filtration layers can comprise one or more filter layers formed of a V shaped filter sheet. The filter layers can be adhered to each other at the V juncture 55 (FIG. 3). It is preferred to utilize two V shaped filter sheets positioned in contact with each other to form the filtration layers 33 and 34.

Figure 4:
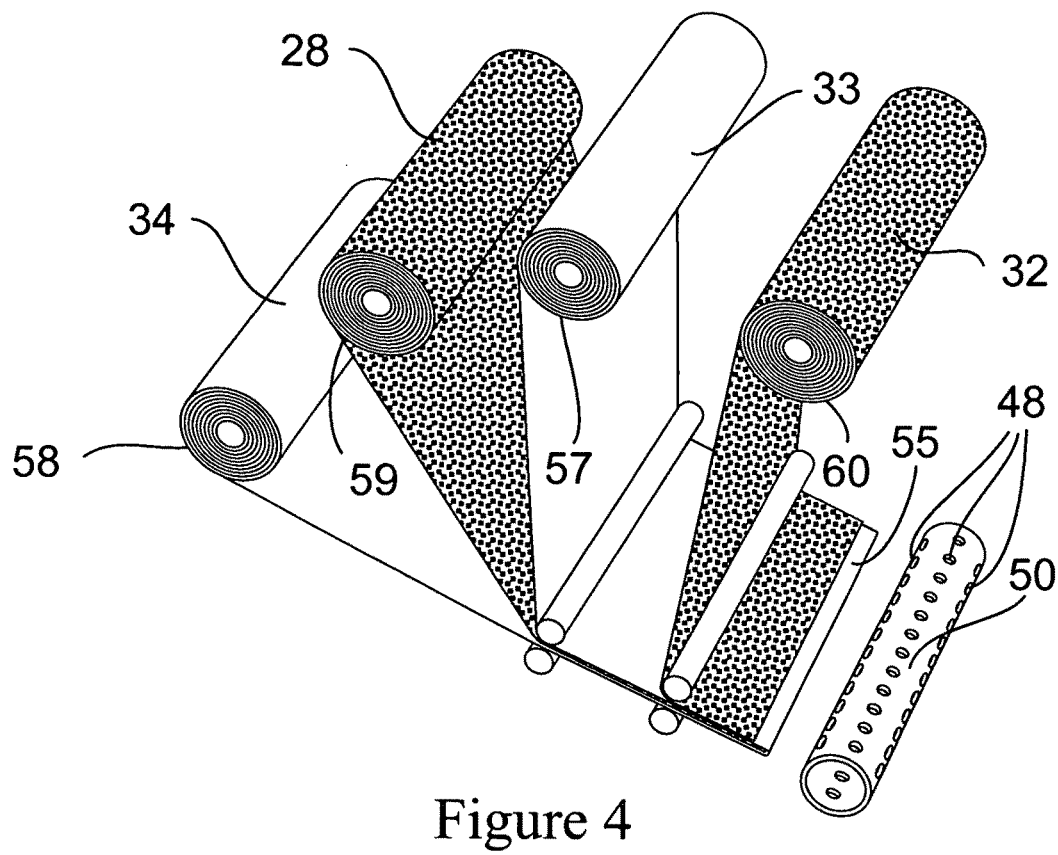
FIG. 4 is a schematic diagram of one method of forming the filtration cartridge of this invention.

Referring to FIG. 4, the process of forming the spirally wound multilayer filter cartridge of this invention is illustrated. The filtration layers 33 and 34 are formed at the V juncture such as with an adhesive. Filtration layer 33 is unrolled from roller 57 and filtration layer 34 is unrolled from roller 58. Feed spacer layer 28 is unrolled from roller 59 and permeate spacer layer 32 is unrolled from roller 60. The feed spacer layer 28 and the permeate spacer layer 32 are sealed as shown in FIG. 7.

Figure 8:
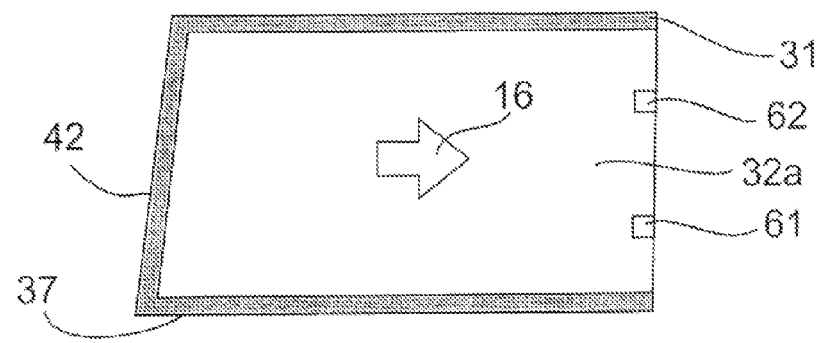
FIG. 8 illustrates an alternative adhesive pattern for a permeate spacer layer of this invention.

The filter layer junction 55 is adhered to core 50. Alternatively, the permeate spacer 32a layer can include a plurality of spaced apart seals 61 and 62 (FIG. 8) to promote adhesion to core 50 while promoting permeate flow through perforations 48.

A filtration cartridge of this invention having a single spacer layer provides efficient filtration when its length in the spiral wound direction is less than about 24 inches, preferably about 16 to 20 inches and most preferably about 18 inches.

Figure 5:
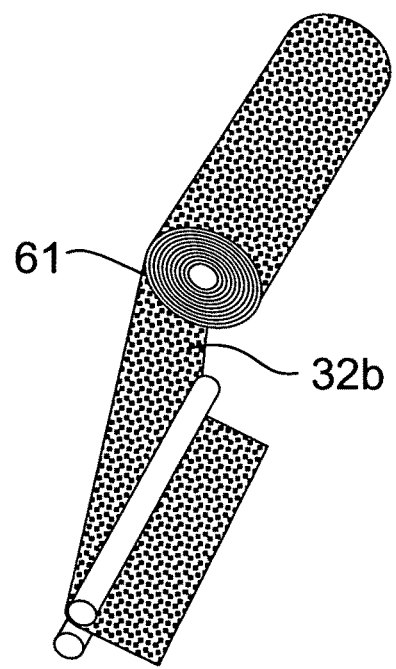
FIG. 5 is a perspective view of an additional permeate spacer layer which can be utilized in a filtration cartridge of this invention.
Figure 6:
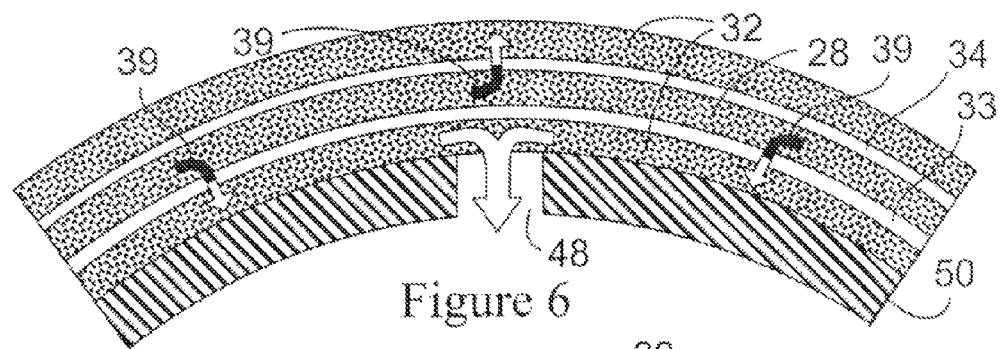
FIG. 6 is a partial cross sectional view of the filtration cartridge of this invention.

Referring to FIG. 5, a second permeate spacer layer 32b is shown. The permeate spacer layer 32b is positioned adjacent permeate spacer layer 32 and rolled as shown in FIG. 4. The result is a thicker permeate spacer layer which promotes permeate flow.

The feed and permeate spacer layers can comprise either a woven or nonwoven material having a high void volume which is permeable to fluid flow in the edgewise direction and at reasonably high rates without the need for high inlet pressures. In addition, the spacer layer should have a thickness sufficiently great to permit substantial fluid flow rates but not so thick as to reduce filter surface area and filter capacity substantially for a given filter volume. It is preferred that the spacer layer be between about 0.020 and 0.030 inches thick. Suitable spacer layers include netting formed by two sets of parallel plastic strands; one set of strands is laid on and adhered to one surface of the other set in an arrangement so that the sets of strands intersect at an angle. Suitable netting is available under the trade name "Vexar" from E.I. DuPont deNemours & Co. The strands have a generally circular cross section. This structure when placed adjacent two flat filter layers has each set of strands in contact with only one adjacent filter layer so that fluid can pass easily into the spacer layer and between the two adjacent filter layers.

The filter layer must be sufficiently pliable to permit winding it around the core without fracturing the filter. While many filter materials are sufficiently pliable for this purpose, some filter materials are too brittle to afford their use and must be modified prior to being incorporated in the multi-layer web. Such filter materials include microporous ultrafiltration and filters formed from cellulose esters such as cellulose acetate and cellulose nitrate and having an average pore size extending into the submicrometer range as small as about 0.025 micrometer, marketed by Millipore Corporation including Celolate® filters, Duralon® filters, Mitex® filters Polyvic® filters, Solvinert® filters and Microweb® filters. To render these filters sufficiently pliable, they may be laminated between two pliable porous materials such as a woven cloth formed from polyester fibers with a net adhesive formed with heat-sealable resin fiber such as polyester, polyethylene or polyamide fibers. However, it is to be understood that the present invention is not limited to the use of ultrafiltration or microporous filter layers but includes the use of any flat filter medium that can be wound in the desired configuration shown.

The type and amount of adhesive employed is such that adhesive will penetrate into the filter layer but not through the filter layer when applied so that sealing on one surface of a filter layer does not result in sealing on the opposite surface. Epoxy or polyurethane-based adhesives are particularly useful for providing the desired sealing.

What is claimed:

1. A filtration apparatus having a plurality of spirally wound filtration cartridges each sealed to prevent admixture of feed and permeate comprising:
   a housing having an interior, a fluid feed inlet, a permeate pathway, and a permeate outlet, wherein the permeate pathway directs permeate into the permeate outlet, and
   a plurality of spirally wound filtration cartridges in parallel, each filtration cartridges comprising,
      a fluid impermeable outer surface,
      a perforated inner core and
      a spirally wound multi-layer material having,
         two opposed spiral end surfaces, said multi-layer material including two flat filter layers formed by folding a filter sheet wherein each filter layer has a first surface, a second surface, a top surface, and a bottom surface such that the fluid feed enters through the housing inlet and enters the filtration cartridges at the top and bottom surfaces,
      a spirally wound permeate spacer layer having a first side, a first side edge seal, a top surface, a top surface edge seal, a first bottom edge seal, and a bottom surface and
      a spirally wound feed spacer layer having a first side, a first side edge seal, a second side, a second side edge seal, a top surface, and a bottom surface,
   the first surface of each filter layer contacting said permeate spacer layer and the second surface of each filter layer contacting said feed spacer layer,
   said feed spacer layer being sealed at said first and second sides to said filter layer by the first and second side edge seals, to permit fluid feed entering each filtration cartridge at the top and bottom surfaces to enter said feed spacer layer and to pass through said filter layers, and
   said permeate spacer layer being sealed at said side to said perforated core by the first side edge seal, and sealed at said bottom surface by the first bottom edge seal to the perforated core, to accept permeate from said filter layer and to direct permeate into said core then into said bottom permeate pathway, whereby permeate exits the filtration apparatus through the housing outlet.

2. The filtration apparatus of claim 1 having between five and six filter cartridges.

3. The filtration apparatus of claim 1 wherein the length of the permeate spacer layer in a spirally wound direction is less than about 24 inches.

4. The filtration apparatus of claim 1 wherein the length of the permeate spacer layer in a spirally wound direction is between about 16 and about 20 inches.

5. The filtration apparatus of claim 1 wherein the length of the permeate spacer layer in a spirally wound direction is about 18 inches.

6. The filtration apparatus of claim 1 wherein said flat filter layers are ultrafiltration membranes.

7. The filtration apparatus of claim 1 wherein said flat filter layers are microporous membranes.

8. The filtration apparatus of claim 1 wherein said flat filter layers are formed from cellulose esters, cellulose acetate and cellulose nitrate.

9. The filtration apparatus of claim 1 wherein said spacer layer has a thickness between about 0.020 inches and 0.030 inches.

10. The filtration apparatus of claim 1 wherein said spacer layer and said permeate spacer layer each comprise a netting formed by two sets of intersecting parallel plastic strands positioned so that fluid can pass into the spacer layer and between the two adjacent filter layers.

11. The filtration apparatus of claim 10 wherein said strands have a generally circular cross section.

12. The filtration apparatus of claim 1 wherein said feed layer and said permeate spacer layers comprise woven or nonwoven materials.

* * * * *